No. 624,946. Patented May 16, 1899.
J. B. KINTNER.
WEEDER.
(Application filed Jan. 6, 1899.)
(No Model.) 2 Sheets—Sheet 1.
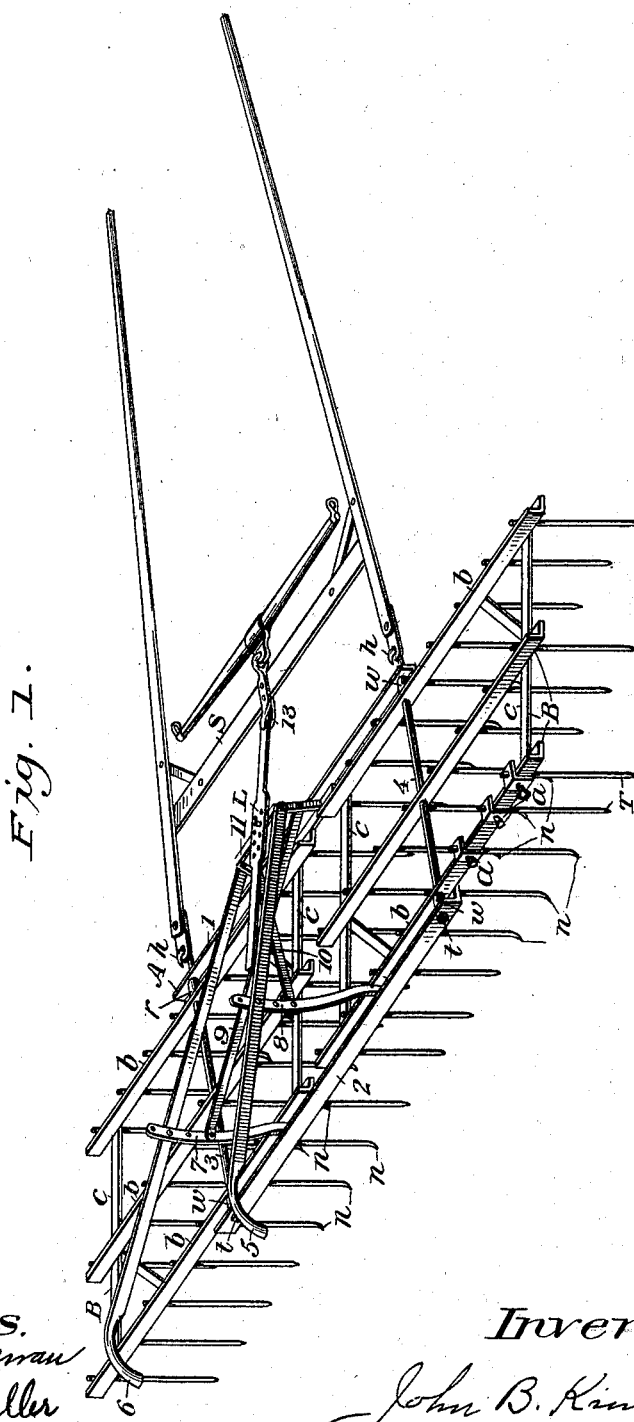
Witnesses.
Inventor.

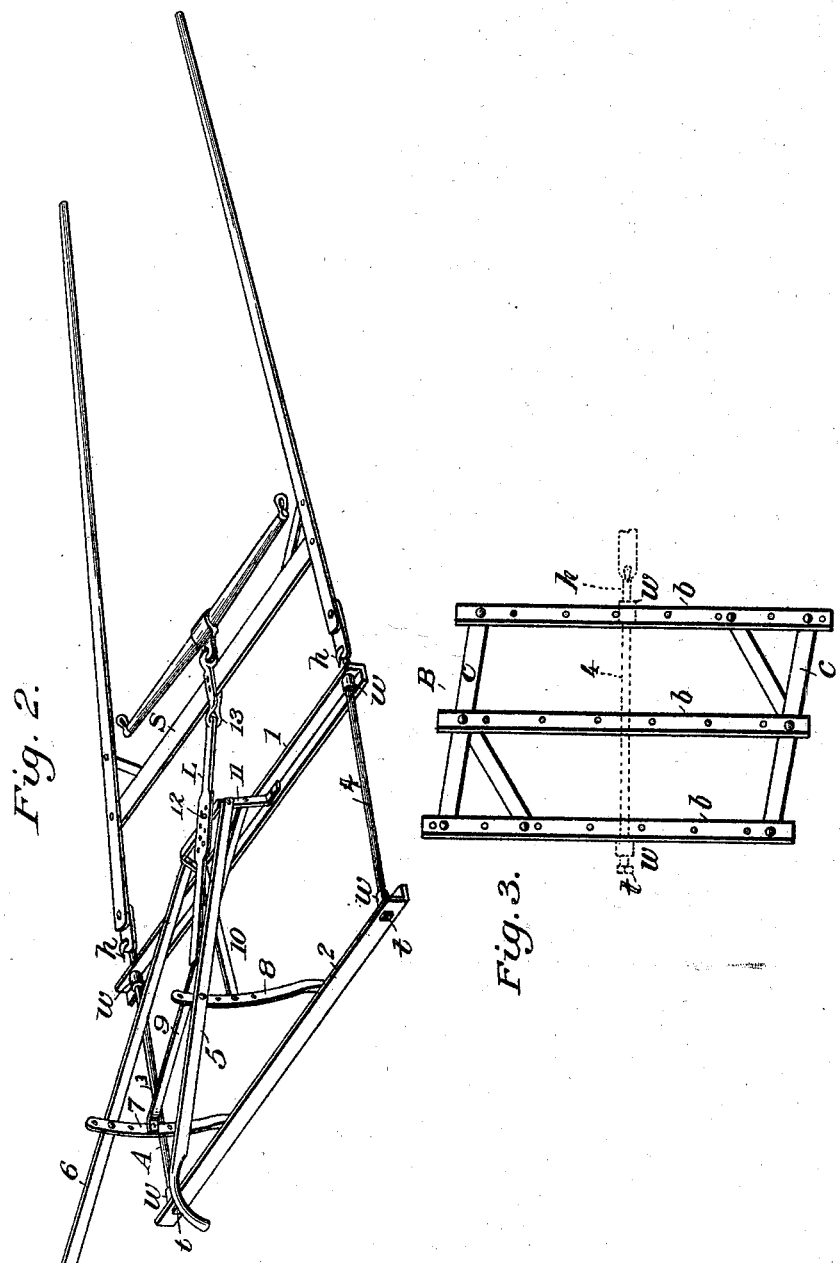

UNITED STATES PATENT OFFICE.

JOHN B. KINTNER, OF MADISONBURG, OHIO.

WEEDER.

SPECIFICATION forming part of Letters Patent No. 624,946, dated May 16, 1899.

Application filed January 6, 1899. Serial No. 701,425. (No model.)

*To all whom it may concern:*

Be it known that I, JOHN B. KINTNER, a citizen of the United States, residing at Madisonburg, in the county of Wayne and State of Ohio, have invented a new and useful Weeder, of which the following is a specification.

My invention relates to that class of agricultural implements known as "weeders." Heretofore such have been constructed with longitudinal beams which support the teeth thereof, made of one continuous piece. These are defective in that the necessary length of such beams does not properly adapt the implement to use on uneven soil.

It is the principal object of my invention to remedy this defect, and I do so by constructing the weeder in two sections, each section made up of several longitudinal beams provided with suitable teeth and rigidly secured together by cross-bars, said sections set in juxtaposition and mounted at opposite ends of a supporting-frame upon pivot-bearings to rock thereon within said frame and form a double weeder-harrow, each section rocking independently of the other.

A further object of my invention is to provide means for adjusting the harrow-frames in horizontal position with reference to any desired elevation of the shafts and also to adapt the teeth to better service and so as to do less damage to the growing corn in the use thereof.

I accomplish these objects by the devices illustrated in the accompanying drawings and as hereinafter fully set forth.

Referring to the drawings, Figure 1 is a perspective view of my invention. Fig. 2 is a like view of the weeder-frame with the sections removed from the pivot-rods. Fig. 3 is a detached view of one of the section-frames with the teeth removed therefrom.

In the drawings similar letters and figures of reference indicate like parts.

A is a supporting-frame made up of longitudinal bars 1 2, preferably of angle-iron. These are united at their opposite ends by cross-rods 3 4. The forward ends of said cross-rods are each formed into a hook $h$, to which the draft-bars S are attached, as shown. Said frame is further reinforced by rigid upright standards 7 8 11, which are braced and united by diagonal bars 9 10, and suitable handles 5 6 are adjustably secured to said standards, as shown. Upon the cross-rods 3 4, as pivots or axes therefor, I mount the two harrow-sections B B, respectively. They are severably made up of longitudinal bars $b\ b\ b$, rigidly united by cross-bars $c\ c$. Said bars $b$ are perforated to receive the upper ends of the teeth T, which are secured therein by screw-clamps $a$, as shown, Fig. 1. Said bars are also perforated horizontally at or near their longitudinal centers of gravity to receive said rods 3 4, upon which they are respectively suspended and pivoted, so as to have their inner ends in juxtaposition within the frame A and to rock longitudinally therein upon said cross-rods 3 4 independently of each other, as aforesaid. Suitable washers or ferrules $w$ upon said rods between the frame-bars and the weeder-sections, respectively, prevent friction of the contiguous parts.

L is a horizontal bar provided with a series of perforations and hinged at its forward end 13 to center of shaft cross-bar S. Said bar extends rearwardly from the shaft cross-bar and is adjustably secured to the upright standard 11 of frame A by a bolt 12 passing through any one of the several perforations, thereby regulating the adjustment of the frame A to any desired elevation of the shafts, so as to maintain the level of the harrow or weeder sections in line of the draft, and thus secure uniformity of depth of front and rear teeth.

It is apparent that a tongue may be substituted for shafts, if desired, and also that the details of formal construction may be modified, and I do not limit myself in such respect.

To more effectually prevent the teeth from tearing up the growing corn, I provide a series of two or more rows of teeth crosswise of the harrow-sections at proper distances to accommodate the width of the corn-rows, said teeth $n$ having their points sharpened and turned backward, as shown. By means of screw-clamp fasteners $a$ I am able to readily elevate and adjust said rows of teeth so as not to enter the soil as deep as the rest of the teeth and also to adjust the weeder-teeth to slant rearwardly, usually about twenty degrees, to suit the soil conditions.

Having thus fully described my invention, what I claim as new, and desire to secure by Letters Patent, is—

1. The combination with frame A, provided with cross-rods 3, 4, of the opposite weeder-harrows B, B, mounted to rock on said rods respectively within said frame, independently of each other; shaft-bar S, and horizontal bar L, said horizontal bar adjustably uniting said shaft-bar and said frame A, substantially as and for the purpose specified.

2. The combination with the supporting-frame, A, made up of parallel bars 1, 2, and cross-rods 3, 4, said rods provided with ferrules $w$, and said frame supplemented by standards 7, 8, 11, united and braced by cross-bars 9, 10, and supporting-handles 5, 6; of the opposite weeder-sections B, B, mounted to rock longitudinally on said rods respectively within said frame; said sections made up of longitudinal bars $b$, and cross-bars, $c$, said bars, $b$, provided with straight teeth T and teeth $n$, having their lower ends curved backward at intermediate points to meet the corn-rows; and the adjusting-bar L, hinged on shaft cross-bar S and adjustably secured to frame-standard 11, substantially as set forth and for the purpose specified.

In witness whereof I hereto set my hand this 11th day of November, 1898.

J. B. KINTNER.

Witnesses:
HIRAM SWARTZ,
ALONZO DOW.